June 11, 1968     I. K DORTORT     3,388,335
EQUALIZED FLUX RESET CIRCUIT FOR MAGNETIC AMPLIFIERS
Filed Dec. 2, 1964     2 Sheets-Sheet 1
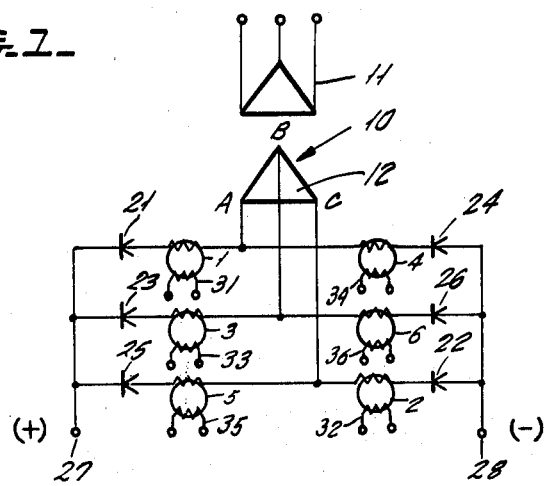
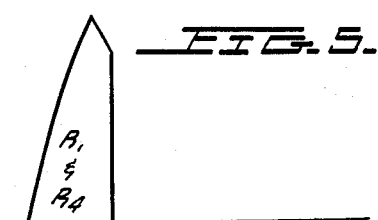
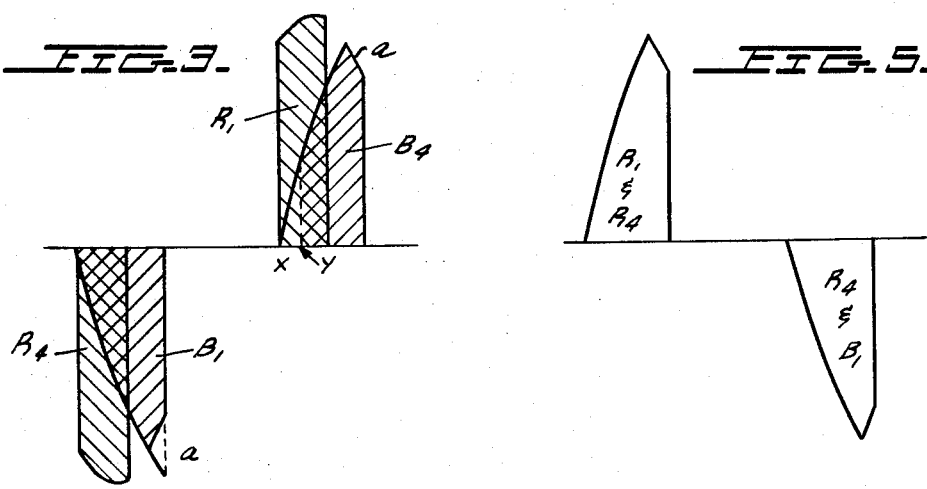
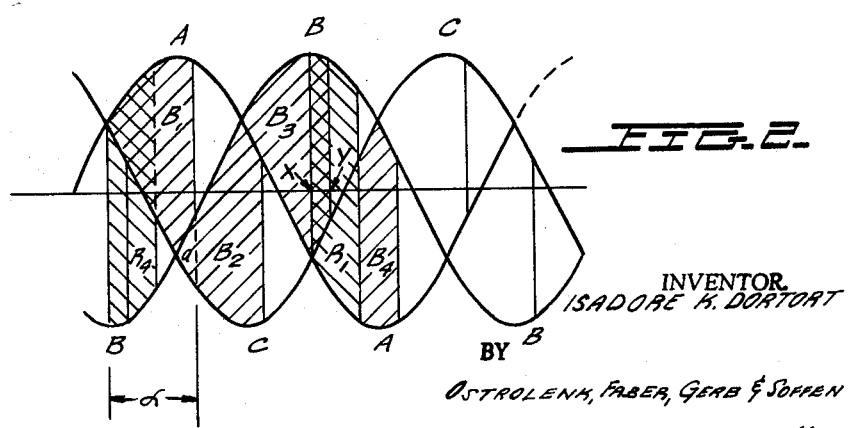
INVENTOR.
ISADORE K. DORTORT
BY
OSTROLENK, FABER, GERB & SOFFEN
ATTORNEYS June 11, 1968     I. K. DORTORT     3,388,335
EQUALIZED FLUX RESET CIRCUIT FOR MAGNETIC AMPLIFIERS
Filed Dec. 2, 1964     2 Sheets-Sheet 2

INVENTOR.
ISADORE K. DORTORT
BY
OSTROLENK, FABER, GERB & SOFFEN
ATTORNEYS

United States Patent Office 3,388,335
Patented June 11, 1968

3,388,335
EQUALIZED FLUX RESET CIRCUIT FOR
MAGNETIC AMPLIFIERS
Isadore K. Dortort, Philadelphia, Pa., assignor to I-T-E
Circuit Breaker Company, Philadelphia, Pa., a corporation of Pennsylvania
Filed Dec. 2, 1964, Ser. No. 415,291
6 Claims. (Cl. 330—8)

ABSTRACT OF THE DISCLOSURE

A three-phase bridge connected magnetic amplifier is disclosed having auxiliary windings on each magnetic core. The auxiliary windings on the magnetic cores in diametrically opposed phases of the magnetic amplifier circuit are directly connected to one another to force equal blocking voltages and resetting voltages on their respective cores.

---

This invention relates to magnetic amplifiers, and more particularly relates to a novel circuit for forcing the equalized flux reset in the various magnetic cores of a magnetic amplifier through the provision of directly connected windings for magnetic cores contained in diametrically opposed phases of the magnetic amplifier circuit.

It is known that magnetic amplifiers, particularly when operating at reduced output, will operate with various types of irregularities with the two halves of the amplifier output being unbalanced. In dealing with this problem which manifested itself as a severe current unbalance between the Y sections of a double Y rectifier equipped with self-saturating reactors for phase control, it was learned that this unbalance was caused by the unequal flux resetting of the reactors on oppoiste sides of the interphase transformer. This is fully explained in co-pending application Ser. No. 300,201, filed Aug. 6, 1963, now U.S. Patent No. 3,302,122, in the name of I. K. Dortort and F. R. Bingham and assigned to the assignee of the instant invention.

In order to overcome this problem, the above noted application develops a relatively complex circuit to force equal flux resetting of the symmetrically disposed magnetic reactors.

This same problem was found, however, to arise in bridge-connected rectifiers as well as in the double Y rectifier, although it previously was of no great effect in the bridge-connected rectifier, since current unbalance could not be caused and the current distortion that was produced could, in most cases, be negelected.

This problem in the bridge-connected rectifier, however, asserts itself in applications where a low ripple output voltage or low ripple output current is required. That is to say, when a rectifier of this type was constructed using self-saturating magnetic reactors for phase control, instabilities occurred producing results precisely like a rectifier in which only one side of the bridge was controlled. Thus, a low frequency ripple of large magnitude was produced. Moreover, it was found that the rectifier would go in and out of this mode of operation with a snap-action, or this instability would swing from one side to the other of the bridge with a snap-type of action, whereupon high accuracy, high speed regulation was upset by the magnitude and instability of the ripple.

The observation of this defect in the bridge-connected type rectifier, as well as in the double Y connected rectifier of the above noted application, gave rise to a thorough study of the problem. As a result of this study, I found that, when using magnetic amplifier-type circuits which have at least two control reactors in a diametrically opposed phases, there will be a time interval during which various reactors are effectively connected in series, with the voltage distribution between these reactors being determined by the precise characteristics of the individual reactors, the leakage current of their respective diodes, the individual commutating impedances and forward losses. This voltage difference is substantially uncontrolled. Indeed, even where exceptional efforts are made during the construction of the reactors to have them exactly match one another, instabilities still occur.

As a result of this study, I concluded that the number of volt seconds reset in the reactors can vary slightly between two reactors in the same phase, whereupon the observed instability found in various types of magnetic amplifier circuits results.

In accordance with the present invention, I have overcome this problem by interconneting the magnetic reactors associated with diametrically opposite phases (hereinafter termed "common phase") to one another by directly connected windings, thereby forcing the amount of flux reset by one reactor to match the amount of flux reversed in the blocking direction by the other reactor.

Thus, in any rectifier circuit, such as a bridge-connected circuit or Y or double Y connected rectifiers, the reactors diametrically opposing one another (or in a common phase) are interconnected to one another.

Accordingly, a primary object of this invention is to eliminate the instabilities which occur in magnetic amplifier circuits.

Another object of this invention is to eliminate the instabilities appearing in bridge-connected magnetic amplifier circuits due to the unequal application of blocking voltage and reset voltage to reactors of the same phase.

Another object of this invention is to permit the use of a relatively inexpensive magnetic reactor in a high accuracy magnetic amplifier.

These and other objects of my invention will become apparent from the following description when taken in connection with the drawings, in which:

FIGURE 1 shows a typical poly-phase bridge-connected magnetic amplifier circuit.

FIGURE 2 shows the input voltage of the magnetic amplifier of FIGURE 1 as a function of time, and indicates, by cross-hatching, the various blocking voltages and reset voltages appearing across the reactors of the circuit of FIGURE 1.

FIGURE 3 shows the voltage as a function of time for two of the reactors in the same phase in FIGURE 1 in accordance with the prior art.

FIGURE 4 shows the novel circuit of the present invention for forcing equal reset voltages on the reactors associated with the same phase in FIGURE 1.

FIGURE 5 illustrates voltage as a function of time for reactors similar to those shown in FIGURE 3 when using the modified circuit of the present invention.

FIGURE 6 shows a modification of the circuit of FIGURE 4.

Referring first to FIGURE 1, I have schematically illustrated therein a typical three-phase bridge-connected magnetic amplifier circuit which includes a main transformer 10 having a primary winding 11, which is connected to some suitable three-phase source, and a secondary winding 12. The secondary winding 12 is a delta-connected winding having corners A, B, and C which are connected to a bridge-connected rectifier circuit which includes magnetic control reactors 1, 2, 3, 4, 5 and 6 in the usual manner. The main winding of reactors 1 through 6 are then connected in series with diodes 21, 22, 23, 24, 25 and 26 respectively. It will be noted that the numerals 1 through 6 also correspond to the sequence of forward current conduction for the circuit of FIGURE 1.

The diametrically opposed reactors 1–4; 3–6; and 2–5 are associated with phases A, B and C, respectively, and thus are respectively in a common phase of the circuit, notwithstanding that they operate 180° out of phase with one another.

A pair of output terminals 27 and 28 which are positive and negative, respectively, are then provided for connection to any suitable load.

Clearly, each of reactors 1 through 6 are provided with suitable control windings in the usual manner and as schematically illustrated in the drawing by the control windings 31, 32, 33, 34, 35 and 36, respectively.

The operation of the circuit of FIGURE 1 is schematically illustrated in FIGURE 2, which is well-known, and shows ideal conditions for ideal reactors 1 through 6. In FIGURE 2, the labels B and R refer to blocking voltage and reset voltage, respectively, which is absorbed by self-saturating reactors feeding a resistive load or an inductive load with free wheeling diodes with a delay angle $\alpha$ greater than 60°. A single cross-hatching slanting upwardly and to the right indicates blocking voltage, while the single cross-hatching slanting downwardly to the right indicates reset voltage. Where both reset voltage and blocking voltage appear simultaneously, their cross-hatching intersects to give the appearance of a double cross-hatched area.

In addition, FIGURE 2 indicates a condition wherein the control windings 31 through 36 are so adjusted that an electrical delay of $\alpha$ exists before any arm of the bridge begins to conduct. Thus, for example, the voltage of phase A is delayed for a period $\alpha$ during which time a blocking voltage appears on the winding of reactor 1, as indicated by area $B_1$. Once the flux of reactor 1 has been completely reversed at the end of period $\alpha$, power conduction through diode 21 may occur.

FIGURE 2 illustrates an interval from time $x$ to time $y$. During this interval, the output voltage at terminals 27 and 28 is zero, and no power current flows to the load circuit. Therefore, reactors 1 and 3 in the time interval between time $x$ and time $y$ are essentially in series and across the points A–B of secondary winding 12. Accordingly, the division of voltage between the reactors 1 and 3 is poorly defined, and is dependent upon the quality of the reactors or the degree of matching of the reactor characteristics, voltage current of their respective diodes, and other mismatched circuit parameters. Furthermore, and at time $x$, reactor 1 ceases the conduction of power current, and its flux begins to reset, as indicated by area $R_1$. At the same time, the diametrically opposite reactor 4 in the same phase as reactor 1 is blocking, as indicated by the blocking voltage area $B_4$. Therefore, in the interval from time $x$ to time $y$, there are three unsaturated reactors 1, 3 and 4, that must be considered as well as one diode 21 which is approaching reverse voltage. All of these effects influence the voltage division between reactors 1, 2 and 3 in a manner which is unpredictable in view of the unpredictable difference between the characteristics of the reactor, diodes, and so on. Moreover, after time $x$, the voltage division between diode 21 and reactor 1 are also indefinite, as described in the above noted application Ser. No. 300,201.

FIGURE 3 shows the theoretical voltages which appear across reactors 1 and 4, as determined from FIGURES 1 and 2. These voltages are labeled $R_4$ indicating the reset voltage of reactor 4, $B_1$ indicating the blocking voltage of reactor 1, $R_1$ indicating the reset voltage of reactor 1, and $B_4$ indicating the blocking voltage of reactor 4.

It will be seen that the wave shape of the blocking reactor is completely fixed by the phase voltages except in the time interval between $x$ and $y$, as well as in the area $a$. The total area of any of the elements of FIGURE 3 can never be greater than the flux reset during the reset period. That is to say, $B_4$ can never be greater than $R_4$, and $B_1$ can never be greater than $R_1$.

The flux reset, however, is indefinite, and, moreover, if the flux reset is not fully utilized during blocking, the next flux reset may go further along the reverse slope of the hysteresis loop of the core causing the complete blocking of that arm of the bridge. This is one of the effects that produces violent swings in the magnetic amplifier output.

Recognizing this possibility, the diametrically opposite reactors of the same phase were then directly connected through respective windings in order to force their blocking and reset volt seconds to be equal. This type of connection was found to eliminate the general instability problem discussed above.

This novel connection is illustrated in FIGURE 4 for the case of a three-phase bridge-connected rectifier similar to that of FIGURE 1. Thus, in FIGURE 4, a main transformer 10 has its secondary winding connected to a bridge-connected circuit including the diodes 21 through 26. In FIGURE 4, the reactors 1 through 6 of FIGURE 1 are replaced by the standard schematic showing of saturable reactor devices 41 through 46 the main windings of which are in series with diodes 21 through 26, respectively.

In accordance with the invention, the saturable reactor cores 41 through 46 are each provided with winding means such as auxiliary windings 51 through 56, respectively, wherein the windings of the reactors of the same phase are directly connected to one another. Thus, windings 51 and 54 are connected together; windings 53 and 56 are connected together; and windings 55 and 52 are connected together. Note that the standard polarity markings are indicated by enlarged black dots at the right-hand side of each of the windings.

Clearly, the winding means for connecting respective reactors to one another could be the main winding or portions thereof, or the control windings, or portions thereof, the auxiliary windings 51 through 56 being shown for purposes of illustration. Thus, FIGURE 6 illustrates one phase of FIGURE 4 wherein control windings 51 and 54 serve to interconnect reactors in the same phase having main windings 41 and 44, respectively.

Clearly, the main windings 41 and 44 could also have been used for the auxiliary circuit means for coupling the two reactors.

In order to control circulating current between pairs of reactors and to control the time constant of the amplifier, small resistors such as resistors 57, 58 and 59 are inserted between each pair of windings. Control current may then be connected to windings 61 through 66 which correspond to the control windings 31 through 36 of FIGURE 1.

Where inductive loads are to be used, a free-wheeling diode means 67 may be connected, as shown in FIGURE 4.

The operation of the circuit of FIGURE 4 can be understood from FIGURE 5, as compared to FIGURES 2 and 3. Thus, from FIGURES 2 and 3, it can be seen that the terminals of the reactors away from the transformer phase connection both go positive or negative at the same time with respect to the phase terminal. Therefore, the two terminals nearest the transformer are tied together, and those furthest from the transformer are tied together. The two voltages; say the blocking voltage of reactor 41 of FIGURE 5, and the reset voltage of reactor 44 of FIGURE 5, and vice versa, are then forced to be identical at every instant, as shown in FIGURE 5.

While the above noted novel circuit configuration has been illustrated in connection with a poly-phase bridge-connected rectifier circuit, it should be noted that the novel connection is also applicable to double Y connected magnetic amplifiers of the type shown in copending application Ser. No. 300,201. Thus, regardless of the type circuit used, the novel interconnecting circuit will produce a firm and definite resetting of the flux of diametrically connected reactors by the A-C voltage with no other uncontrollable impedances in series with this connection.

Although there has been described a preferred embodiment of this novel invention, many variations and modifications will now be apparent to those skilled in the art.

Therefore, this invention is to be limited, not by the specific disclosure herein, but only by the appending claims.

The embodiments of the invention in which an exclusive privilege or property is claimed are defined as follows:

1. A polyphase magnetic amplifier comprising a polyphase source of power, a plurality of magnetic reactors, and a plurality of rectifiers and a load; each said magnetic reactor having a magnetic core having a main winding, a control winding, and an auxiliary winding thereon; each phase of said magnetic amplifier having a positive and negative section connected at a junction with the respective phase of said polyphase source connected to said junction; each said positive section and negative section including one of said magnetic reactors and one of said rectifiers with the main winding of said magnetic reactor connected in series with said rectifier between said polyphase power and said load whereby each phase of said magnetic amplifier is connected across said load; each said magnetic reactor having different hysteresis loop characteristics, said control windings being connected in series with each other and with said source of control power; said auxiliary windings of said magnetic reactors of said positive and negative sections of each of said phases being directly connected in series with each other, thereby to force equal blocking voltages and resetting voltages on said reactors connected in the same phase of said polyphase system.

2. The amplifier substantially as set forth in claim 1 which includes a current limiting impedance connected in each of said direct connections of said auxiliary windings.

3. A polyphase magnetic amplifier comprising a polyphase source of power, a plurality of magnetic reactors, and a plurality of rectifiers, each of said magnetic reactors having a magnetic core having a main winding and a control winding thereon; each phase of said magnetic amplifier having a positive and negative section connected at a junction with the respective phase of said polyphase source connected to said junction; each said positive sections and negative sections including one of said magnetic reactors and one of said rectifiers with the main winding of the said magnetic reactor connected in series with said rectifier between said polyphase source of power and a load whereby each phase of said magnetic reactors having different hysteresis loop characteristics; a source of control power; said control windings being connected in closed series connection with each other and in series with said source of control power, thereby to force equal blocking voltages and resetting voltages by said reactors connected in the same phase of said polyphase system.

4. The amplifier substantially as set forth in claim 3 which includes a current limiting impedance connected in said circuit connection means.

5. A polyphase magnetic amplifier comprising a polyphase source of power, a plurality of magnetic reactors, and a plurality of rectifiers, each of said magnetic reactors having a magnetic core having a winding means thereon; each phase of said magnetic amplifier having a positive and negative section connected at a junction with the respective phase of said polyphase source connected to said junction; each said positive sections and negative sections including one of said magnetic reactors and one of said rectifiers with the winding means of said magnetic reactor connected in series with said rectifier between said polyphase source of power and a load whereby each phase of said magnetic amplifiers is connected across said load; each of said magnetic reactors having different hysteresis loop characteristics; a source of control power; said winding means of said magnetic reactors of each of said sections, respectively, being connected in series with each other and with said source of control power; and circuit connection means directly connecting predetermined equal portions of said winding means of said magnetic reactors of said positive and negative sections of each of said phases in series with one another, thereby to force equal blocking voltages and resetting voltages on said reactors connected in the same phase of said multiphase system.

6. The amplifier substantially as set forth in claim 5 which includes a current limiting impedance connected in said circuit connection means.

References Cited

UNITED STATES PATENTS

| | | |
|---|---|---|
| 2,554,203 | 5/1951 | Morgan. |
| 2,710,313 | 6/1955 | Logan _____ 330—8 X |
| 3,136,927 | 6/1964 | Marlow _____ 330—8 X |
| 3,177,447 | 4/1965 | Geyger _____ 330—8 X |

ROY LAKE, *Primary Examiner.*

NATHAN KAUFMAN, *Examiner.*